United States Patent [19]

Olander

[11] 4,184,999

[45] Jan. 22, 1980

[54] STABILIZED POLYPHENYLENE ETHER RESIN COMPOSITIONS CONTAINING HINDERED PHENOLS

[75] Inventor: Walter K. Olander, Mt. Vernon, Ind.

[73] Assignee: General Electric Company, Pittsfield, Mass.

[21] Appl. No.: 925,993

[22] Filed: Jul. 19, 1978

[51] Int. Cl.$^2$ .......................... C08K 7/14; C08L 53/02
[52] U.S. Cl. ...................................... 260/42.18; 260/4; 260/42.47; 260/45.7 R; 260/45.7 P; 260/45.75 B; 260/45.9 R; 260/45.9 NP; 525/192; 525/194
[58] Field of Search ............... 260/892, 4, 874, 876 R, 260/45.95 B, 42.18, 45.7 T, 45.95 T, 45.7 R, 45.7 P, 45.9 R, 45.9 NP, 45.75 B; 528/215, 212

[56] References Cited

U.S. PATENT DOCUMENTS

| | | | |
|---|---|---|---|
| 3,465,062 | 9/1969 | Holoch et al. | 260/874 |
| 3,700,750 | 9/1972 | Yamanouchi et al. | 260/874 |
| 3,956,242 | 5/1976 | Olander | 528/215 |
| 3,981,841 | 9/1976 | Abolins et al. | 260/42.18 |

Primary Examiner—J. Ziegler
Attorney, Agent, or Firm—Morgan, Finnegan, Pine, Foley & Lee

[57] ABSTRACT

Novel compositions are disclosed which include a polyphenylene ether resin, an alkenyl aromatic resin modified with rubber, and a hindered phenol as a stabilizer. Also included within the scope of this invention are reinforced and flame-retardant compositions of the polyphenylene ether resin, the alkenyl aromatic resin modified with a rubber, and the hindered phenol.

34 Claims, 1 Drawing Figure

STABILIZED POLYPHENYLENE ETHER RESIN COMPOSITIONS CONTAINING HINDERED PHENOLS

This invention relates to improved compositions of a polyphenylene ether resin, an alkenyl aromatic resin that is modified with a rubber, and a hindered phenol. Reinforced and flame-retardant compositions are also provided.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,256,358. In the Hay patents, the polyphenylene ethers are prepared by an oxidative coupling reaction comprising passing any oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al., U.S. Pat. No. 3,337,892; Blanchard et al., U.S. Pat. No. 3,219,626; Laakso et al., U.S. Pat. No. 3,342,892; Borman, U.S. Pat. No. 3,344,116; Hori et al., U.S. Pat. No. 3,384,619; Faurote et al., U.S. Pat. No. 3,440,217; and Copper et al., U.S. Pat. No. 3,661,848, U.S. Pat. No. 3,733,299, U.S. Pat. No. 3,838,102, and U.S. Pat. No. 3,988,297. Disclosures relating to metal based catalysts which do not include amines, are known from patents such as Wieden et al., U.S. Pat. No. 3,442,885 (copper-amidines); Nakashio et al., U.S. Pat. No. 3,573,257 (metal-alcholate or -phenolate); Kobyashi et al., U.S. Pat. No. 3,445,880 (cobalt chelates); and the like. In the Stamatoff patent, the polyphenylene ethers are produced by reacting the corresponding phenolate ion with an initiator, such as peroxy acid salt, and acid peroxide, a hypohalite, and the like, in the presence of a complexing agent. Disclosures relating to non-catalytic processes, such as oxidation with lead oxide, silver oxide, etc., are described in Price et al., U.S. Pat. No. 3,383,212. Cizek, U.S. Pat. No. 3,383,435 discloses polyphenylene ether-styrene resin compositions. All of the above-mentioned disclosures are incorporated by reference.

In the prior art, rubber-modified styrene resins have been admixed with polyphenylene ether resins to form compositions that have modified properties. The Cizek patent, U.S. Pat. No. 3,383,435, discloses rubber-modified styrene resin-polyphenylene ether resin compositions wherein the rubber component is of the unsaturated type such as polymers and copolymers of butadiene. The physical properties of these compositions are such that it appears that many of the properties of the styrene resins have been upgraded, while the moldability of the polyphenylene ethers are improved.

In view of the improved properties resulting from the presence of rubber-modified sytrene resins, it is desirous to inhibit reactions which can result in degradation of the rubber component. Hindered phenols have been employed as oxidation stabilizers for materials such as hydrocarbons, rubbers, polyolefins, and the like. Some of the advantages claimed are a reduction in the initial color or in the rate of oxygen absorption of impact strength upon heat-aging. For example, Yamanouchi et al., U.S. Pat. No. 3,700,750, which is incorporated herein by reference, discloses the use of certain sterically hindered phenols in combination with thioesters, phosphites, or arylamines in polyphenylene oxide compositions.

It has now been found that a composition of a polyphenylene ether resin prepared by use of a manganese bis(benzoin oxime) catalyst system, a rubber modified alkenyl aromatic resin, and a hindered phenol is a very useful thermoplastic molding material having good thermal oxidative stability and improved impact strength.

It is, therefore, a primary object of this invention to provide improved compositions that are based on polyphenylene ether resins prepared by use of a manganese bis(benzoin oxime) catalyst system, modified alkenyl aromatic resins, and hindered phenols.

Another object of this invention is to provide molding compositions and molded articles that are based on a polyphenylene ether resin, a rubber modified alkenyl aromatic resin, and a hindered phenol and that overall have improved thermal oxidative stability.

Still another object of this invention is to provide molding compositions and molded articles that are based on a polyphenylene ether resin, a rubber modified alkenyl aromatic resin and a hindered phenol and that have improved impact strength.

It is also an object of this invention is to provide the above-described, improved molding compositions in reinforced and/or flame-retardant embodiments.

DESCRIPTION OF THE INVENTION

The above-mentioned advantages and objects and others will be readily apparent to those skilled in the art by the following compositions.

Preferred types will include thermoplastic compositions which comprise:
(a) a polyphenylene ether resin prepared by use of a manganese bis(benzoin oxime) catalyst system;
(b) a rubber-modified alkenyl aromatic resin; and
(c) a hindered phenol.

The invention is directed to polyphenylene ether resin prepared by use of a manganese bis(benzoin oxime) catalyst system. The preferred polyphenylene ethers are of the formula

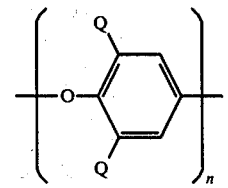

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

Examples of polyphenylene ethers corresponding to the above formula can be found in the above-referenced patents of Hay and Stamatoff. Especially preferred is poly(2,6-dimethyl-1,4-phenylene) ether.

The alkenyl aromatic resin should have at least 35% of its units derived from an alkenyl aromatic monomer of the formula

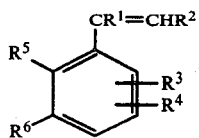

II wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group.

Specific examples of alkenyl aromatic monomer include styrene, bromostyrene, chlorostyrene, α-methylstyrene, vinyl-xylene, divinylbenzene, vinyl naphthalene, and vinyl-toluene.

The alkenyl aromatic monomer may be copolymerized with materials such as these having the general formula

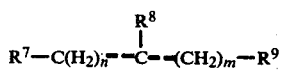

III wherein the dotted lines each represents a single or a double carbon to carbon bond; $R^7$ and $R^8$ taken together represent a

linkage; $R^9$ is selected from the group consisting of hydrogen, vinyl, alkyl of from 1 to 12 carbon atoms, alkenyl of from 1 to 12 carbon atoms, alkylcarboxylic acid of from 1 to 12 carbon atoms, and alkenylcarboxylic acid of from 1 to 12 carbon atoms; n is 1 or 2, depending on the position of the carbon-carbon double bond; and m is an integer of from 0 to about 10. Examples inclue maleic anhydride, citraconic anhydride, itaconic anhydride, aconitic anhydride, and the like.

The alkenyl aromatic resins include, by way of example, homopolymers such as homopolystyrene and monochloropolystyrene, and styrene-containing copolymers, such as styrene-chlorostyrene copolymers, styrene-bromostryene copolymers, the styrene acrylonitrile-α-alkyl styrene copolymers, styrene-acrylonitrile copolymers, styrene butadiene copolymers, stryene-acrylonitrile butadiene copolymers, poly-α-methylstyrene, copolymers of ethylvinylbenzene, divinylbenzene, and styrene maleic anhydride copolymers, and block copolymers of styrene butadiene and styrene-butadiene styrene.

The styrene-maleic anhydride copolymers are described in U.S. Pat. No. 2,971,939, U.S. Pat. No. 3,336,267, and U.S. Pat. No. 2,769,804, all of which are incorporated herein by reference.

The alkenyl aromatic resins are modified with rubbers. Among the rubbers which can be employed are natural and synthetic elastomers, such as diene rubbers, e.g., polybutadiene, polyisoprene, and the like. Moreover, the rubbers can comprise random, block, and interpolymers of conventional types, e.g., butadiene-styrene random copolymers and styrene-butadiene-styrene block copolymers.

The useful hindered phenols include (i) phenols of the formula

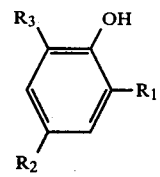

wherein $R_1$ and $R_3$ are hydrocarbon groups having from one to about 20 carbon atoms, and $R_2$ is a hydrogen atom or a hydrocarbon group having from one to about 20 carbon atoms, and (ii) bisphenols of the formula

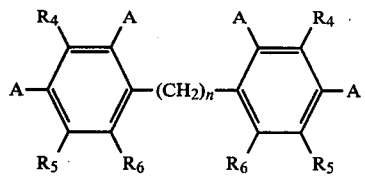

wherein $R_4$, $R_5$, and $R_6$ are each a hydrogen atom or a hydrocarbon group having from one to about 20 carbon atoms; one of the two A's on each ring is a hydroxyl group and the other A on each ring is a hydrogen atom or a hydrocarbon group having from one to about 20 carbon atoms; and n is an integer of from 0 to about 20.

Preferred hindered phenols useful in this invention include 2,6-di-tert-butyl-4-methyl-phenol, commonly known as BHT (sold under the tradename Ionol by Shell Chemical Co.); 4,4-methylene bis(2,6-di-tert-butylphenol) and 2,6-di-tert-butyl-4-n-butylphenol (sold under the tradename Ethyl 702 and Ethyl 744, respectively, by Ethyl Corp.); and tetrakis[methylene 3-(3',5'-di-tert-butyl-4'-hydroxyphenyl) proprionate]methane and stearyl-3-(3',5'-di-tert-butyl-4'-hydroxyphenyl) proprionate (sold under the tradenames Irganox 1010 and Irganox 1076, respectively, by Ciba-Geigy).

Also useful according to this invention is 2,4,6-tris-(3'-5-di-tert-butyl-4-hydroxybenzyl)-1,3,5-triazine, which is sold under the tradename Goodrite 3114 by the B. F. Goodrich Chemical Co.

The hindered phenols can also be employed in admixture with phosphites or alkylamines. A preferred phosphite is catechol-2,6-di-tert-butyl-4-methyl-phenol-phosphite. A preferred alkylamine is dimethyl-octadecylamine, which is sold under the tradename Armeen DM18D by the Armak Company.

Components (a), (b), and (c) are combinable in a fairly wide range of proportions. Preferably, the compositions of this invention will comprise from about 20 to about 80 parts by weight of polyphenylene ether resin (a), from about 20 to about 80 parts by weight of rubber-modified alkenyl aromatic resin (b), and from about 0.1 to about 5 parts by weight of hindered phenol (c), based on the total weight of the composition. A phosphite or alkylamine can be present in an amount from about 0.1 to about 5 parts by weight based on the total weight of the composition.

The compositions of the invention can also include other ingredients, such as flame retardants, extenders, processing aids, pigments, stabilizers, fillers such as mineral fillers and glass flakes and fibers, and the like. In particular, reinforcing fillers, in amounts sufficient to impart reinforcement, can be used, e.g. aluminum, iron or nickel, and the like, and non-metals, e.g., carbon filaments, silicates, such as acicular calcium silicate, asbestos, titanium dioxide, potassium titanate and titanate whiskers, glass flakes and fibers, and the like. It is to be understood that, unless the filler adds to the strength and stiffness of the composition, it is only a filler and not a reinforcing filler as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a), (b), and (c) will comprise from about 10 to about 90 parts by weight and the filler will comprise from about 10 to about 90 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, by flame blowing, or by mechanical pulling. The preferred filaments for plastics reinforcement are made by mechanical pulling. The filament diameters range from about 0.000112 to 0.00075 inch, but this is not critical to the present invention.

In general, the best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70 to 80% by weight of glass. These concentrates can then be custom blended with resin compositions that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about $\frac{1}{8}$" to about 1" long, preferably less than $\frac{1}{4}$" long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.005 and 0.125 inch.

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flame-retardant. Sizings, if present, can readily be removed by heat cleaning or other techniques well known to those skilled in the art.

It is also a feature of this invention to provide flame-retardant thermoplastic compositions, as defined above, by modifying the composition to include a flame-retardant additive in a minor proportion but in an amount at least sufficient to render the composition non-burning or self-extinguishing. The flame-retardant additives useful in this invention comprise a family of chemical compounds well known to those skilled in the art. Such flame-retardant additives include a halogenated organic compound, a halogenated organic compound in admixture with an antimony compound, elemental phosphorus, a phosphorus compound, compounds containing phosphorus-nitrogen bonds, or a mixture of two or more of the foregoing.

Among the useful halogen-containing compounds are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octobromobiphenyl, decabromobiphenyl, and halogenated diphenyl ethers containing from 2 to 10 halogen atoms.

The preferred halogen compounds for this invention are aromatic halogen compounds such as chlorinate benzene, brominated benzene, chlorinated biphenyl, chlorinated terphenyl, brominated biphenyl, brominated terphenyl, or a compound comprising two phenyl radicals separated by a divalent alkylene group and having at least two chlorine or bromine atoms per phenyl nucleus, or mixtures of at least two of the foregoing.

Especially preferred are hexabromobenzene and chlorinated biphenyls or terphenyls, alone or mixed with antimony oxide.

The preferred phosphate is triphenyl phosphate. It is also preferred to use triphenyl phosphate in combination with hexabromobenzene and, optionally, antimony oxide. Expecially preferred is a composition comprised of mixed triaryl phosphates with one or more isopropyl groups on some or all of the aryl rings, such as Kronitex 50 supplied by Food Machinery Corporation.

Other flame-retardant additives are known to those skilled in the art. See, for example, Cooper et al., U.S. Pat. No. 3,943,191, incorporated herein by reference.

In general, however, the amount of additive will be from about 0.5 to 50 parts by weight per hundred parts of components (a), (b), and (c). A preferred range will be from about 1 to 25 parts, and an especially preferred range will be from about 3 to 15 parts of additive per hundred parts of (a), (b), and (c). Smaller amounts of compounds highly concentrated in the elements responsible for flame retardance will be sufficient, e.g., elemental red phosphorus will be preferred at about 0.5 to 10 parts by weight per hundred parts of (a), (b), and (c), while phosphorus in the form of triphenyl phosphate will be used at about 3 to 25 parts of phosphate per hundred parts of (a), (b), and (c), and so forth. Halogenated aromatics will be used at about 2 to 20 parts and synergists, e.g, antimony oxide, will be used at about 1 to 10 parts by weight per hundred parts of components (a), (b), and (c).

The compositions of the invention may be formed by conventional techniques, that is, by first dry mixing the components to form a premix, and then passing the premix through an extruder at an elevated temperature, e.g., 425° to 640° F.

By way of illustration, glass roving (a bundle of strands of filaments) is chopped into small pieces, e.g., $\frac{1}{8}''$ to 1" in length, and preferably less than $\frac{1}{4}''$ in length, and put into an extrusion compounder with (a) the polyphenylene ether resin, (b) the rubber modified aromatic resin, (c) the hindered phenol, and (d) the flame-retardant additive(s), to produce molding pellets. The fibers are shortened and predispersed in the process, coming out at less than 1/16" long. In another procedure, glass filaments are ground or milled to short lengths, are mixed with the polyphenylene ether resin, the modified alkenyl aromatic polymer, the hindered phenol, and optionally, flame-retardant additive(s), by dry blending, and then are either fluxed on a mill and ground; or are extruded and chopped.

In addition, compounding should be carried out to insure that the residence time in the machine is short; that the temperature is carefully controlled; that the frictional heat is utilized; and that an intimate mixture between the resins and the additives is obtained.

DESCRIPTION OF THE PREFERRED EMBODIMENTS

Figure 1:
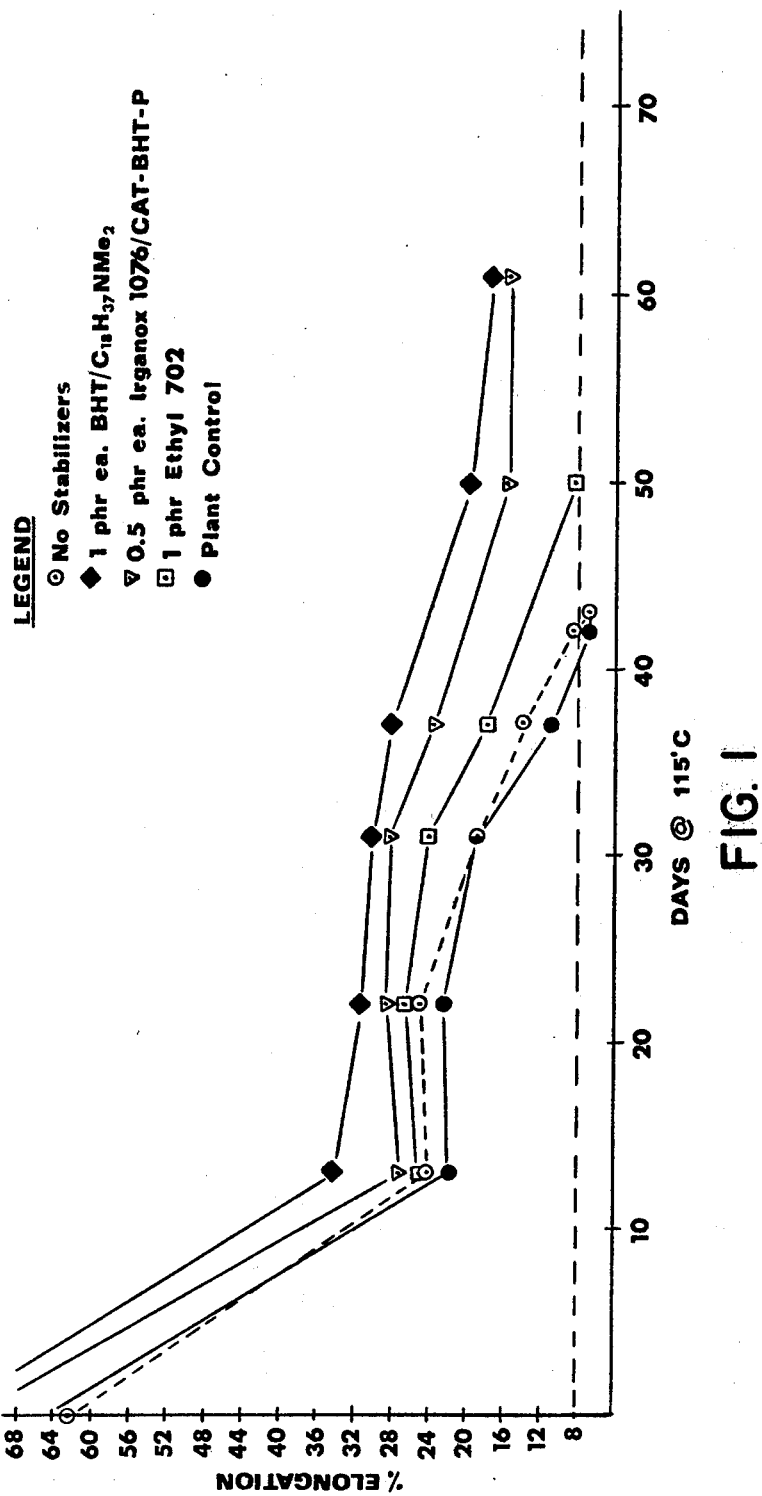
FIG. 1 demonstrates the enhanced characteristics of polyphenylene ether resin compositions containing stabilizers according to this invention.

The following examples are set forth as further illustration of the invention and are not to be construed as limiting the invention thereto.

EXAMPLES I AND II 2,6-xylenol was oxidized in toluene solution, using a manganese bis(benzoin oxime) catalyst. The reaction mixture was thoroughly mixed with water, and the polymer, poly(2,6-dimethyl-1,4-phenylene) ether (PPO), was separated from the reaction solution by a centrifuge light phase separation procedure wherein the catalyst was left entrained in the polymer. The PPO had an intrinsic viscosity of 0.49 dl/g (ref. Olander, U.S. Pat. No. 3,956,242).

Fifty parts of the PPO, 50 parts of FG-834 (a rubber-modified polystyrene available from Foster Grant Co.), 3 parts of titanium dioxide, and one part of Irganox 1010, were mixed together and extruded in a 25" twin-screw vacuum extruder (barrel temperature 600° F.). The extruded pellets were molded into standard test pieces on a 3 oz. Newbury injection molding machine (barrel 500° F., mold 180° F.). A similar composition containing instead one part of Ionol was prepared. These two compositions and a control sample having no stabilizer were then tested, and the results were as follows:

Table 1.

| EXAMPLE | IZOD$^a$ | GARDNER$^b$ | Y.I.$^c$ | +1 Y.I.$^d$ | % ELONG.$^e$ | DAYS TO BRITTLE$^f$ |
|---|---|---|---|---|---|---|
| I (1 part Irganox 1010) | 4.50 | 340 | 25.0 | 5.3 | 64.6 | 54 |
| II (1 part Ionol) | 4.89 | 330 | 24.0 | 5.3 | 64.0 | 52 |
| C-1* | 4.80 | 300 | 24.1 | 5.4 | 50.3 | 34 |

*Control
$^a$Izod Impact Strength (ft. lbs./in. notch)
$^b$Gardner Impact Strength (in. lbs.)
$^c$Yellowing Index initially
$^d$Days to increase one Y.I. unit
$^e$Tensile Elongation (%)
$^f$Days to Brittlement (at 115° C.)

EXAMPLES III-V

Compositions similar to those above were prepared, and a stabilizer, Ionol, was added in the amount of 0.5, 1.0, and 2.0 parts. These compositions, and a control sample were tested, with the following results.

Table 2.

| EXAMPLE | IZOD$^a$ | GARDNER$^b$ | Y.I.$^c$ | +1 Y.I.$^d$ | % ELONG$^e$ | DAYS TO BRITTLE$^{f,g}$ |
|---|---|---|---|---|---|---|
| III (0.5 part Ionol) | 5.54 | 250 | 24.0 | 6.7 | 70.0 | 59 |
| IV (1.0 part Ionol) | 5.42 | 250 | 24.4 | 6.6 | 67.1 | >63$^g$ |
| V (2.0 parts Ionol) | 4.68 | 280 | 24.5 | 6.5 | 59.7 | >59$^g$ |
| C-2* | 4.60 | 160 | 24.4 | 5.4 | 44.6 | 45–47 |

*Control
$^a$Izod Impact Strength (ft. lbs./in. notch)
$^b$Gardner Impact Strength (in. lbs.)
$^c$Yellowing Index initially
$^d$Days to increase one Y.I. unit
$^e$Tensile Elongation (%)
$^f$Days to Brittlement (at 115° C.)
$^g$The sample was expended before the onset of embrittlement.

EXAMPLES VI-IV

PPO was prepared by oxidizing 2,6-xylenol in toluene solution, utilizing a manganese bis(benzoin oxime) catalyst. The reaction mixture was thoroughly mixed with a quantity of water, the resulting mixture was separated by liquid-liquid centrifugation, and the aqueous phase was discarded. The PPO was precipitated by the addition of methanol. The PPO was filtered off, washed with methanol, and dried.

A portion of the centrifuge light phase layer was not methanol precipitated but "crumbed" instead. This PPO is totally isolated by azeotropoing away the solvent in a large volume of hot water.

The PPO isolated by each means had an intrinsic viscosity of 0.50 dl/g.

PPO compositions containing stabilizers were prepared using the above-described procedure employing a 28 mm Warner-Pfleiderer vacuum extruder. The compositions and the results of testing are described below.

Table 3.

| EXAMPLE | STABILIZER(s)$^a$ | IZOD$^b$ | GARDNER$^c$ | Y.I.$^d$ | +1 Y.I.$^e$ | TENSILE ELONGATION INITIAL$^f$ | DAYS TO 8% |
|---|---|---|---|---|---|---|---|
| C-3* (MeOH ppt.) | NONE | 4.70 | 350 | 21.0 | 7.0 | 63.2 | 42 |
| IV (MeOH ppt.) | 1.0 Ionol 1.0 NMe$_2$C$_{18}$H$_{37}$ | 5.21 | 350 | 19.5 | 9.3 | 76.3 | >>60 |
| V (MeOH ppt.) | 1.0 Ethyl 702 | 5.96 | 350 | 24.4 | 0.5 | 84.9 | 50 |
| VI (MeOH ppt.) | 0.5 Irganox 1076 0.5 CAT-BHT-P$^h$ | 6.06 | 320 | 21.9 | 7.3 | 72.9 | >>60 |
| C-4* Crumbed | NONE | 4.92 | — | 21.6 | 5.7 | 48.3 | ~34 |
| VII$^i$ Crumbed | 1.0 Ionol | 5.57 | — | — | — | 68.6 | ≥50 |
| C-5** (MeOH ppt.) | NONE | 4.61 | 280 | 29.8 | 7.4 | 64.6 | ~40 |

*Control
**Control, commercially available PPO prepared using a Cu/DBA catalyst system
$^a$Stabilizers (PHR)
$^b$Izod Impact Strength (ft. lbs./in. notch)
$^c$Gardner Impact Strength (in. lbs.)
$^d$Yellowing Index initially
$^e$Days to increase one Y.I. unit
$^f$Tensile Elongation initially (%)
$^g$dimethyl-octadecylamine, sold under the Tradename Armeen DM18D
$^h$Catechol-BHT-Phosphite:

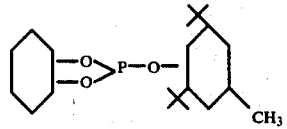

$^i$No TiO$_2$ present

The stabilization of polyphenylene ether resin compositions according to this invention, as represented by the relationship between tensile elongation and days at 115° C., is set forth in FIG. 1.

It can be seen from the above that thermoplastic molding compositions comprising a PPO resin prepared using a manganese bis(benzoin oxime) catalyst system, a rubber modified alkenyl aromatic polymer, and a hindered phenol have improved impact strength. They also demonstrate improved resistance to yellowing and exhibit improved tensile elongation properties at high temperature.

Obviously, other modification and variations of the present invention are possible in the light of the above teachings. It is, therefore, to be understood that changes may be made in the particular embodiments described above which are within the full intended scope of the invention as defined in the appended claims.

We claim:

1. A thermoplastic molding composition having improved impact strength and comprising in initmate admixture
   (a) a polyphenylene ether resin prepared by use of manganese bis(benzoin oxime) catalyst system;
   (b) an alkenyl aromatic resin modified with a rubbery diene polymer; and
   (c) a hindered phenol.

2. The molding composition of claim 1 wherein the alkenyl aromatic resin is modified with a rubbery interpolymer of butadiene.

3. The molding composition of claim 1 wherein the polyphenylene ether resin is selected from the compounds of the formula

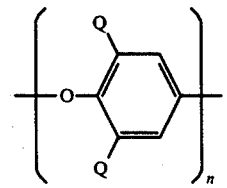

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and the halohydrocarbonoxy radicals having at least two carbon atoms between the halogen atom and the phenyl nucleus.

4. The molding composition of claim 1 wherein the alkenyl aromatic resin is prepared from a monomer selected from the group consisting of styrene, α-methylstyrene, bromostyrene, chlorostyrene, divinylbenzene, and vinyltoluene.

5. The molding composition of claim 1 wherein the hindered phenol is selected from (i) phenols of formula

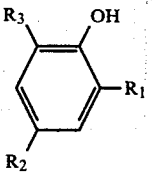

wherein $R_1$ and $R_3$ are hydrocarbon groups having from one to about 20 carbon atoms, and $R_2$ is a hydrogen atom or a hydrocarbon group having from one to about 20 carbon atoms, and (ii) bisphenols of the formula

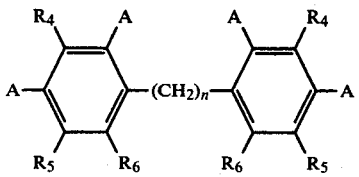

wherein $R_4$, $R_5$, and $R_6$ are each a hydrogen atom or a hydrocarbon group having from one to about 20 carbon atoms; one of the two A's on each ring is a hydroxyl group and the other A on each ring is a hydrogen atom or a hydrocarbon group having from one to about 20 carbon atoms; and n is an integer of from 0 to about 20.

6. The molding composition of claim 1 wherein the hindered phenol is 2,6-di-tert-butyl-4-methyl-phenol.

7. The molding composition of claim 1 wherein the hindered phenol is employed in admixture with phosphites or alkylamines.

8. The molding composition of claim 1 wherein the hindered phenol is employed in admixture with catechol-2,6-di-tert-butyl-4-methyl-phenol phosphite or dimethyl-octadecylamine.

9. The molding composition of claim 1 wherein the composition includes a reinforcing amount of an inorganic reinforcing filler.

10. The molding composition of claim 9 wherein the composition includes from about 10 to about 50% by weight of fibrous glass filaments, based on the total weight of the composition.

11. The molding composition of claim 1 wherein the composition includes a flame-retardant amount of a flame-retardant additive.

12. The molding composition of claim 11 wherein the flame retardant is a halogenated organic compound, a halogenated organic compound in admixture with an antimony compound, elemental phosphorus, a phosphorus compound, compounds containing phosphorus-nitrogen bonds, or a mixture of two or more of the foregoing.

13. A thermoplastic molding composition having improved impact strength and comprising in intimate admixture (a) from about 20 to about 80 parts by weight of a polyphenylene ether resin prepared by use of a manganese bis(benzoin oxime) catalyst system;
(b) from about 20 to about 80 parts by weight of an alkenyl aromatic resin modified with a rubbery diene polymer;
(c) from about 0.1 to about 5 parts by weight of a hindered phenol, based on the weight of the total composition.

14. The molding composition of claim 13 wherein the polyphenylene ether resin is poly (2,6-dimethyl-phenylene) ether.

15. The molding composition of claim 13 wherein the rubbery diene polymer comprises polybutadiene.

16. The molding composition of claim 13, wherein the alkenyl aromatic resin is styrene and said rubbery diene polymer is present between about 4% and about 25% by weight of styrene and rubbery diene polymer combined.

17. A thermoplastic molding composition having improved impact strength and comprising in intimate admixture (a) from about 20 to about 80 parts by weight of a polyphenylene ether resin prepared by use of a manganese bis(benzoin oxime) catalyst system;
(b) from about 20 to about 80 parts by weight of an alkenyl aromatic resin modified with rubbery diene polymer;
(c) from about 0.1 to about 5 parts by weight of a hindered phenol; and
(d) a reinforcing amount of an inorganic reinforcing filler.

18. The molding composition of claim 17 wherein the polyphenylene ether resin is poly (2,6-dimenthyl-1,4-phenylene) ether.

19. The molding composition of claim 17 wherein the rubbery diene polymer comprises polybutadiene.

20. The molding composition of claim 17 wherein the reinforcing filler comprises from about 10 to about 50% of fibrous glass filaments, based on the total weight of the composition.

21. A thermoplastic molding composition having improved impact strength and comprising in intimate admixture (a) from about 20 to about 80 parts by weight of a polyphenylene ether resin prepared by use of a manganese bis(benzoin oxime) catalyst system.
(b) from about 20 to about 80 parts by weight of an alkenyl aromatic resin modified with a rubbery diene polymer;
(c) from about 0.1 to about 5 parts by weight of a hindered phenol and;
(d) a flame-retardant amount of a flame-retardant additive.

22. The molding composition of claim 21 wherein the rubbery diene polymer comprises polybutadiene.

23. The molding composition of claim 21 wherein the flame-retardant additive is a halogenated organic compound, a halogenated organic compound in admixture with an antimony compound, elemental phosphorus, a phosphorus compound, compounds containing phosphorus-nitrogen bonds, or a mixture of two or more of the foregoing.

24. The molding composition of claim 21 wherein the flame-retardant additive comprises a mixture of an organic bromine-containing compound with antimony oxide.

25. The molding composition of claim 21 wherein the flame-retardant additive is triphenylphosphate.

26. The molding composition of claim 21 wherein the flame-retardant additive is comprised of a mixture of triaryl phosphates wherein one or more aryl groups are substituted by one or more isopropyl groups.

27. A thermoplastic molding composition having improved impact strength and comprising in intimate admixture
   (a) a polyphenylene ether resin prepared by use of manganese bis(benzoin oxime) catalyst system;
   (b) an alkenyl aromatic resin modified with a rubbery diene polymer; and
   (c) a hindered phenol selected from (i) phenols of formula

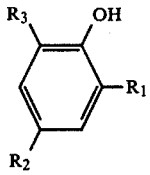

wherein $R_1$ and $R_3$ are hydrocarbon groups having from one to about 20 carbon atoms, and $R_2$ is a hydrogen atom or a hydrocarbon group having from one to about 20 carbon atoms, and (ii) bisphenols of the formula

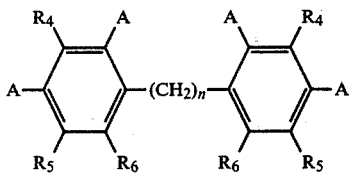

wherein $R_4$, $R_5$, and $R_6$ are each a hydrogen atom or a hydrocarbon group having from one to about 20 carbon atoms; one of the two A's on each ring is a hydroxyl group and the other A on each ring is a hydrogen atom or a hydrocarbon group having from one to about 20 carbon atoms; and n is an integer of from 0 to about 20.

28. The molding composition of claim 27 wherein the hindered phenol is employed in admixture with phosphates or alkylamines.

29. The molding composition of claim 27 wherein the hindered phenol is employed in admixture with catechol-2,6-ditertbutyl-4-methyl-phenol phosphite or dimethyl-octadecylamine.

30. The molding composition of claim 27 wherein the composition includes a reinforcing amount of an inorganic reinforcing filler.

31. The molding composition of claim 27 wherein the composition includes a flame-retardant amount of a flame-retardant additive.

32. A thermoplastic molding composition having improved impact strength and comprising in intimate admixture
   (a) from about 20 to about 80 parts by weight of a polyphenylene ether resin prepared by use of a manganese bis(benzoin oxime) catalyst system;
   (b) from about 20 to about 80 parts by weight of an alkenyl aromatic resin modified with a rubbery diene polymer;
   (c) from about 0.1 to about 5 parts by weight of a hindered phenol set forth in claim 27,
based on the weight of the total composition.

33. A thermoplastic molding composition having improved impact strength and comprising in intimate admixture
   (a) from about 20 to about 80 parts by weight of a polyphenylene ether resin prepared by use of a manganese bis(benzoin oxime) catalyst system;
   (b) from about 20 to about 80 parts by weight of an alkenyl aromatic resin modified with rubbery diene polymer;
   (c) from about 0.1 to about 5 parts by weight of a hindered phenol set forth in claim 27; and
   (d) a reinforcing amount of an inorganic reinforcing filler,
based on the total weight of the composition.

34. A thermoplastic molding composition having improved impact strength and comprising in intimate admixture
   (a) from about 20 to about 80 parts by weight of a polyphenylene ether resin prepared by use of a manganese bis(benzoin oxime) catalyst system.
   (b) from about 20 to about 80 parts by weight of an alkenyl aromatic resin modified with a rubbery diene polymer.
   (c) from about 0.1 to about 5 parts by weight of a hindered phenol set forth in claim 27; and
   (d) a flame-retardant amount of a flame-retardant additive, based on the total weight of the composition.

* * * * *

UNITED STATES PATENT AND TRADEMARK OFFICE
CERTIFICATE OF CORRECTION

PATENT NO. : 4,184,999

DATED : January 22, 1980

INVENTOR(S) : Walter Karl Olander

It is certified that error appears in the above—identified patent and that said Letters Patent is hereby corrected as shown below:

Col. 1, line 21, "3,256,358" should read --3,257,358--;

Col. 1, line 65, "sytrene" should read --styrene--;

Col. 2, line 32, delete "is" (second occurrence);

Col. 3, line 40, "represents" should read --represent--;

Col. 3, line 55, "inclue" should read --include--;

Col. 6, line 36, "chlorinate" should read --chlorinated--;

UNITED STATES PATENT AND TRADEMARK OFFICE
CERTIFICATE OF CORRECTION

PATENT NO. : 4,184,999

DATED : January 22, 1980

INVENTOR(S) : Walter Karl Olander

It is certified that error appears in the above—identified patent and that said Letters Patent is hereby corrected as shown below:

Col. 9, line 50, in the formula

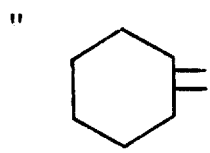   should read

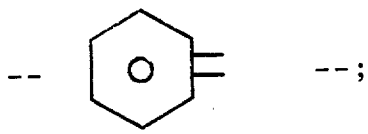 ;

Col. 10, line 5, "initmate" should read --intimate--; and

Col. 12, line 35, "dimenthyl" should read --dimethyl--.

Signed and Sealed this

Tenth Day of February 1981

[SEAL]

Attest:

RENE D. TEGTMEYER

Attesting Officer

Acting Commissioner of Patents and Trademarks